(12) United States Patent
Chmela et al.

(10) Patent No.: US 7,415,963 B2
(45) Date of Patent: Aug. 26, 2008

(54) METHOD FOR OPERATING AN INTERNAL COMBUSTION ENGINE

(75) Inventors: Franz Chmela, Graz (AT); Janos Csato, Budapest (HU); Helmut Eichlseder, Graz (AT); Guenter Figer, Stuttgart (DE); Christian Fuchs, Stefan (AT); Michael Glensvig, Graz (AT); Peter Herzog, Graz (AT); Thomas Kammerdiener, Graz (AT); Klemens Neunteufl, Graz (AT); Gerhard Pirker, Graz (AT); Theodor Sams, Graz (AT); Michael Weissbaeck, Graz (AT); Andreas Wimmer, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/575,113

(22) PCT Filed: Apr. 16, 2004

(86) PCT No.: PCT/AT2004/000132

§ 371 (c)(1),
(2), (4) Date: Jun. 6, 2006

(87) PCT Pub. No.: WO2005/033496

PCT Pub. Date: Apr. 14, 2005

(65) Prior Publication Data

US 2007/0023005 A1    Feb. 1, 2007

(30) Foreign Application Priority Data

Oct. 9, 2003    (AT) ............................. GM694/2003

(51) Int. Cl.
F02B 3/12 (2006.01)
F02D 41/40 (2006.01)
F02M 25/07 (2006.01)

(52) U.S. Cl. ..................... 123/299; 123/276; 123/300; 123/568.21; 123/661

(58) Field of Classification Search ................. 123/276, 123/279, 299, 300, 301, 568.21, 661; 239/533.2
See application file for complete search history.

(56) References Cited

U.S. PATENT DOCUMENTS 5,000,144 A    3/1991    Schweinzer et al. ......... 123/276

(Continued)

FOREIGN PATENT DOCUMENTS

AT    380311    5/1986

(Continued)

OTHER PUBLICATIONS

H. Yanagihara et al., "A Study of DI Diesel Combustion . . . Mixture Formation" in JSAE Review, Society of Automotive Engineers of Japan, Bd 18, No. 3, Jul. 1997, pp. 247-254.

Primary Examiner—T. M Argenbright
(74) Attorney, Agent, or Firm—Dykema Gossett PLLC (57) ABSTRACT

The invention relates to a direct-injection internal combustion engine that is operated in a first operating range associated with the low part load, with largely homogeneous combustion of the mixture and subsequent injection. Said internal combustion engine is operated in a second operating range associated with the middle part load, with low-temperature combustion of the mixture. In this way, minimum nitrogen oxide and soot emissions and a high degree of efficiency can be achieved both in the lower part load region and up to the full load region.

80 Claims, 6 Drawing Sheets

U.S. PATENT DOCUMENTS

| | | | | |
|---|---|---|---|---|
| 5,143,038 A | * | 9/1992 | Dahlgren et al. | 123/403 |
| 5,199,398 A | * | 4/1993 | Nylund | 123/299 |
| 5,996,558 A | * | 12/1999 | Ouellette et al. | 123/446 |
| 6,158,413 A | | 12/2000 | Kimura et al. | 123/306 |
| 6,338,245 B1 | | 1/2002 | Shimoda et al. | 60/285 |
| 6,705,543 B2 | * | 3/2004 | Carroll et al. | 239/96 |
| 6,725,838 B2 | * | 4/2004 | Shafer et al. | 123/300 |
| 6,769,635 B2 | * | 8/2004 | Stewart et al. | 123/300 |
| 6,843,434 B2 | * | 1/2005 | Lawrence et al. | 239/533.2 |
| 6,978,760 B2 | * | 12/2005 | Stewart et al. | 123/299 |
| 7,207,311 B2 | * | 4/2007 | Chmela et al. | 123/305 |

FOREIGN PATENT DOCUMENTS

| | | |
|---|---|---|
| DE | 974449 | 12/1960 |
| DE | 1122325 | 1/1962 |
| DE | 2136594 | 2/1972 |
| DE | 4333425 | 4/1994 |
| DE | 10040738 | 3/2001 |
| EP | 0383001 | 8/1990 |
| EP | 1085176 | 3/2001 |
| JP | 60206960 | 10/1985 |

* cited by examiner

METHOD FOR OPERATING AN INTERNAL COMBUSTION ENGINE

BACKGROUND OF THE INVENTION

1. Field of the Invention

The invention relates to a method for operating an internal combustion engine, in particular a diesel engine, and to an internal combustion engine suitable for implementing the method.

2. The Prior Art

The most important variables governing the combustion process in a combustion engine with internal combustion are the phase of the course of combustion, or rather the beginning of combustion, the maximum rate of increase of cylinder pressure, and the peak cylinder pressure.

In an internal combustion engine in which combustion occurs essentially by self-ignition of a directly injected volume of fuel, the governing variables are largely determined by injection timing, charge composition, and ignition lag. These parameters in turn depend on a multitude of variables, such as engine speed, amount of fuel, intake temperature, charge pressure, effective compression ratio, amount of inert gas in the cylinder charge, and temperature of the various parts of the engine.

Increasingly strict legal requirements necessitate the development of novel concepts in combustion design, in order to reduce the emission of particulates and $NO_x$ in diesel engines.

It is known that $NO_x$ and particulate emission in the exhaust gas may be reduced by increasing the ignition lag by advancing the start of injection, such that combustion occurs by self-ignition of a lean fuel-air mixture. A variant of this type is termed the HCLI-method (Homogeneous Charge Late Injection). In a combustion process of this type fuel injection takes place at a distance from top dead center of the compression phase that is large enough to give rise to a largely homogeneous fuel-air mixture. By means of exhaust gas recirculation the combustion temperature may be kept below the temperature required for $NO_x$-formation. Since the homogenization of fuel and air is time-dependent, this method is limited as regards engine speed and load, and particle emission will increase if homogenization is insufficient.

U.S. Pat. No. 6,338,245 B1 describes a diesel engine with internal combustion operating according to the HCLI-method, in which combustion temperature and ignition lag are chosen in such a way that in the region of low to medium load the combustion temperature lies below the temperature of $NO_x$-formation and the air ratio lies above the value at which particulates are produced. Combustion temperature is regulated by varying the exhaust gas recirculation rate, ignition lag is regulated via the timing of fuel injection. At medium to high load the combustion temperature is lowered such that $NO_x$ and particulate formation are both reduced. It is disadvantageous that especially in the medium load region a low air ratio combines with low combustion temperature and thus efficiency is lost.

U.S. Pat. No. 6,158,413 A describes a direct-injection diesel engine with internal combustion, in which-fuel injection does not occur before top dead center of compression and in which oxygen concentration in the combustion chamber is reduced by exhaust gas recirculation. This method is referred to as HPLI-method (Highly Premixed Late Injection). Because of the decrease in temperature level after top dead center—in comparison with conventional injection before top dead center—and the increased amount of recirculated exhaust gas—as compared to conventional operation—the ignition lag is greater than in the case of so-called diffusive combustion. The low temperature level regulated by exhaust gas recirculation causes the combustion temperature to remain below the value necessary for $NO_x$-formation. The large ignition lag caused by retarded injection permits good mixing, thus avoiding local oxygen deficiency during combustion and in turn reducing the formation of particulate matter. The back-shifting of the combustion process causes a reduction of maximum temperature, but at the same time leads to an increase of mean temperature at a certain late crank angle, which results in an increased burning of particulates. Shifting the combustion into the expansion stroke in combination with a high exhaust gas recirculation rate will result in a rate of pressure increase in the cylinder which will remain within acceptable limits, despite a larger premixed fuel volume due to the large ignition lag and consequently a higher maximum combustion rate. A disadvantage of the method is again low efficiency at low load.

From the publication "Homogeneous Charge Compression Ignition (HCCI) of Diesel Fuel", Allen W. Gray et al., SAE 971676, it is known that in combustion of a self-ignited lean fuel-air mixture very low emission values of $NO_x$ and soot are realised due to the homogeneous distribution of concentration and temperature. In the English-speaking world this method is known as the HCCI-method (Homogeneous Charge Compression Ignition).

It is further known to design pistons for diesel internal combustion engines with an essentially toroidal recess in the piston top, which is referred to as piston recess. In the transition area between piston top and piston recess a constriction or throat is provided resulting in a relatively narrow flow cross-section. The narrow flow cross-section will cause high mixture formation energy and thus substantially improved fuel conditioning. Pistons with such toroidal piston recesses are known from disclosures EP 0 383 001 A1, DE 1 122 325 AS, AT 380 311 B, DE 21 36 594 A1, DE 974 449 C or JP 60-206960 A, for instance. In conventionally operated internal combustion engines such pistons have the following beneficial consequences for the operating behaviour of the internal combustion engine: smoke-limiting full load may be increased; high compression ratios may be realised, resulting in lower combustion noise due to smaller ignition lag, less hydro-carbon emission, better start-up behaviour and an improved efficiency of the engine; there is also the possibility of retarding ignition without substantial increase of smoke, fuel consumption or HC-emission, since mixture formation energy remains high for a longer period of time. This possibility will above all lead to a decrease of nitrogen oxides, combustion noise and maximum cylinder pressure.

Furthermore, in DE 11 22 325 C1 a piston is described with a piston recess and a constriction, where a step-shaped depression is provided between squish surface and constriction.

In internal combustion engines operated according to the HCLI or the HPLI-method such piston types with a deep and constricted piston recess have not been used up to now, since it was assumed that start-up behaviour and thermodynamic efficiency would strongly deteriorate due to the deep piston recess and the strong squish flow. For this reason U.S. Pat. No. 6,158,413 A has proposed to suppress the squish flow completely by using a piston with a very shallow recess.

It is the object of the present invention to develop a method of operating an internal combustion engine, which will have minimum nitrogen oxide and particulate emission from low loads up to full load while maintaining high efficiency over the whole range.

According to the invention this object is achieved by the following steps:
- operating the internal combustion engine in a first operating region corresponding to low partial loads, with essentially homogeneous mixture combustion and late fuel injection, starting fuel injection in a range of about 50° to 5° crank angle before top dead center of the compression phase;
- operating the internal combustion engine in a second operating region corresponding to medium partial loads, with low-temperature mixture combustion and even later injection than in the first operating region, starting fuel injection in a range of about 2° crank angle before top dead center to about 20° crank angle, and preferably 10° crank angle, after top dead center of the compression phase,
- with fuel being injected into the combustion chamber in the first operating region via first injection orifices and in the second operating region at least via second injection orifices of an injection valve configured preferably as a double needle nozzle.

In the first operating region the internal combustion engine works according to the HCLI-method, in which fuel injection is timed relatively early in the compression stroke, i.e., in a range of approximately 50° to 5° crank angle before top dead center. Fuel injection in this first operating region occurs preferably at pressures between 400 and 1,000 bar. Combustion mainly occurs between 10° crank angle before and 10° crank angle after top dead center, resulting in very high efficiency. Due to the relatively high exhaust gas recirculation rate of between 50% and 70% the local combustion temperature lies below the temperature where $NO_x$ are produced. The local air ratio remains above the limit for particulate formation. Exhaust gas recirculation may be realised by external or internal recirculation or by a combination of both using variable valve control.

In the second operating region the internal combustion engine is operated according to the HPLI-method. Here the main part of the injection phase lies after top dead center of compression. Due to the lower temperature level after top dead center—as compared with conventional injection before top dead center—and the increased amount of recirculated exhaust gas of between 20% and 40% vis-a-vis conventional operation, the ignition lag is increased. If necessary, further measures may be adopted to increase the ignition lag, such as lowering the effective compression ratio and/or the intake temperature, or shortening the duration of injection by increasing injection pressure and/or increasing the cross-section of the injection nozzle orifices. The duration of injection is chosen such that the end of injection lies before the start of combustion. In this case emission of particulates may be kept at a very low level. This may be explained by the fact that the simultaneous occurrence of liquid fuel in the fuel jet and of the flame surrounding the jet in the conventional case is avoided, whereby oxidation reactions in the vicinity of the jet, which take place under conditions of air deficiency and will generate particulates, are also eliminated. For the combustion method of the second operating region injection pressures of at least 1,000 bar are required. The advantage of the method lies in very low $NO_x$ and particulate emission and in the relatively high exhaust gas temperature, which in turn is advantageous in the regeneration of devices for filtering the particle-exhaust gas stream.

Preferentially it is provided that in the first operating region fuel is injected at a lower rate of flow than in the second operating region. Particularly low nitrogen oxide and particulate emissions may be achieved if in the first and second operating regions fuel is injected in the shape of fuel jets forming a conical surface, with the apex angle of the cone in the first operating region differing from that in the second operating region, preferably by being smaller in the former.

In further development of the invention it is provided that in a third operating region corresponding to higher partial loads or to full load the main part of fuel injection takes place in the range of 10° crank angle before to 10° crank angle after top dead center, where it is preferably provided that in this third operating region multiple injection be used. The exhaust gas recirculation rate in this region amounts to as much as 30%, and preferably 10% to 20%. This will ensure good performance combined with low $NO_x$ and low particulate emission.

In the third operating region fuel may be injected through the first and/or through the second injection orifices.

The internal combustion engine is operated in the first, second and/or third operating region with an overall air ratio of approximately 1.0 to 2.0.

In a preferred embodiment it is provided that exhaust gas recirculation be carried out externally and/or internally and that swirl be variable for at least one region, and preferably for all three regions. Swirl values between 0 and 5 will lead to good exhaust gas values at low fuel consumption.

Furthermore it is of advantage if the geometric compression ratio is variable. The geometric compression ratio should be variable in the range from 13 to 19. A high compression ratio is advantageous for the coldstart phase. Reducing the compression ratio as the load increases will increase the maximum load attainable in the first as well as in the second operating region and will reduce particulate emission due to larger ignition lag.

In this context it may be provided that the effective compression ratio be varied by shifting the closing time of at least one intake valve. By delaying the closing of the intake valve or by a very early closing of the intake valve the effective compression ratio may be reduced, thereby permitting a reduction of the exhaust gas recirculation rate required for low $NO_x$ and particulate emission. It is possible to shift both the opening time and the closing time of the intake valve, or to shift only the closing time.

In a further variant of the invention it is provided that the changeover from first to second operating region, or back from second to first region, be initiated by reducing or increasing the exhaust gas recirculation rate. Alternatively, the changeover from first to second operating region of the engine or vice versa may be initiated by reducing the internal or external recirculation rate and by retarding the beginning of injection, respectively by increasing the recirculation rate and advancing the start of injection.

Preferably it is provided that the reduction of the exhaust gas recirculation rate on changing from first to second operating region of the engine be achieved by appropriately controlling the opening and/or closing time of the intake valve.

The effective mean pressure in the first operating region is preferably between 0 and 6 bar, and more preferably 5.5 bar, in the second operating region between 3.5 and 8 bar, and more preferably between 4 and 7 bar, and in the third operating region at least 5.5 bar, and more preferably at least about 6 bar.

For implementation of the method a direct injection diesel engine is required, with at least one cylinder with a reciprocating piston, in which the beginning of fuel injection may be varied at least between 50° crank angle before top dead center and 20° after top dead center, and preferably up to 50° after top dead center, and in which the exhaust gas recirculation rate may be varied between 0% and 70%. Furthermore it is provided that fuel injection pressure be variable at least between a first and a second pressure level, where the first pressure level preferably covers a range of 1,000 bar or less, and the second pressure level covers a range of 1,000 bar or more. Furthermore, a device for changing the swirl level may be provided.

It is also of advantage if the opening time and the closing time of the intake process are variable. To this end it is advantageous if the timing of the intake valve and also the timing of the exhaust valve may be shifted by means of a phase shifting device. It is of particular advantage if at least one intake valve can be activated during the exhaust phase.

Additionally or alternatively, activation of at least one exhaust valve during the intake phase may be provided.

Injection is best performed using a double needle nozzle with a first and a second injection orifice, which may be activated individually.

To obtain different rates of flow in the first and the second operating region it may be provided that the first injection orifices have a smaller total flow cross-section than the second injection orifices.

Since different combustion strategies are employed in the first and second operating region it is of advantage if the axes of the first injection orifices are situated along a first conical surface and the axes of the second injection orifices are situated along a second conical surface, where the apex angle of the first cone may be smaller than the apex angle of the second cone.

In a particularly preferred variant of the invention it is provided that the first and the second nozzle needle are coaxial, with the first needle preferably guided in the second needle, which is configured as a hollow needle. Alternatively it is also possible to position first and second needle in parallel, side by side in a nozzle holder.

Double needle nozzles with coaxial needles or needles positioned parallel to each other are known from DE 100 40 738 A1.

For HCLI-operation it is provided that at least one piston with at least one squish surface and a toroidal piston recess and a constriction in the transition area between squish surface and piston recess be provided, and that a squish flow directed from outside into the piston recess be generated during the upward stroke of the piston, and that fuel is at least to the greater part injected into the toroidal piston recess and transported by the squish flow along the side wall of the piston recess and/or along the piston bottom, evaporating at least partly along the way. The fuel jet is injected into the squish flow entering the piston recess. The squish flow transports the greater part of the fuel into the piston recess, where it evaporates and is approximately homogeneously mixed with the inflowing air. The flow in the piston recess depends on the presence or absence of swirl in the intake flow.

Preferentially it is provided that the fuel is injected in the direction of the constriction of the piston, with the axis of at least one fuel jet carrying the greater part of the fuel at the beginning of injection intersecting an area between the side wall of the piston recess and the squish surface, which area comprises an overhanging wall area, the constriction and an inflow area between squish surface and constriction.

In conventional diesel engines with internal combustion the intersection point of the fuel jet and the injection time are chosen in such a way that the fuel hits the overhanging wall area beneath the constriction at the beginning of injection—independently of the load situation. In the present invention it is provided that the intersection point be located in the overhanging wall area of the piston recess for low loads and that with increasing load the intersection point be shifted towards the constriction. This can be achieved by advancing the injection in time. Part of the fuel will thus be injected—against the squish flow—into the gap between piston and cylinder head. A great part of the fuel injected into the gap between piston and cylinder head will be washed into the piston recess by the squish flow. This will improve air distribution and mixture preparation and advantageously reduce HC and CO emission. Combustion of the fuel-air mixture occurs in the piston recess as well as in the gap between piston top and cylinder head.

Since the internal combustion engine is operated at relatively high exhaust gas recirculation rates of 50% to 70%, local combustion temperature lies below the temperature of $NO_x$ formation. The local air ratio remains above the value at which soot is formed. Exhaust gas recirculation may be of the internal or external type or may be achieved by a combination of both methods via variable valve control. Fuel injection occurs at an injection pressure between 500 and 2,500 bar. The main part of combustion occurs between 10° crank angle before and 10° crank angle after top dead center, resulting in a high degree of efficiency. The internal combustion engine is operated with an overall air ratio of approximately 1.0 to 2.0.

For HPLI-operation it is provided by the invention that at least one piston with at least one squish surface and a toroidal piston recess and a constriction in the transition area between squish surface and piston recess be provided, and that a squish flow directed from outside into the piston recess be generated during the upward stroke of the piston and a turbulent base flow be initiated in the piston recess, and that fuel be injected at least to the greater part into the toroidal piston recess and transported by the squish flow along the side wall of the piston recess and/or along the piston bottom, evaporating at least partly along the way. The flow in the piston recess depends on the presence or absence of swirl in the intake flow.

Combustion of the fuel-air mixture occurs in the piston recess as well as in the gap between piston top and cylinder head.

In HPLI-operation the main part of the injection phase lies after top dead center of compression. Because of the lower temperature level after top dead center—as compared to conventional injection before top dead center—and because of the increased volume of recirculated exhaust gas, between 20% and 40%—again as compared to conventional operation—, the ignition lag is increased. Further measures may be adopted to increase ignition lag, such as decreasing the effective compression ratio and/or the intake temperature, or shortening the duration of injection by increasing injection pressure and/or the cross-section of the injection nozzle orifices. Duration of injection is chosen such that the end of injection precedes the start of combustion. In this case particulate emission may be kept at a very low level. This can be explained by the fact that the simultaneous occurrence of liquid fuel in the fuel jet and of the flame conventionally surrounding the jet is avoided, whereby oxidation reactions in the vicinity of the jet, which are taking place under lack of air and are thus generating particulates, also are eliminated. The HPLI combustion regime requires injection pressures of at least 500 bar. The advantage of this regime lies in very low $NO_x$ and particulate emission and in a relatively high exhaust gas temperature, which in turn is advantageous for the regeneration of particle-exhaust-gas filtering devices. The internal combustion engine is operated with an overall air ratio of approximately 1.0 to 2.0.

It is also of advantage if the geometric compression ratio is variable. The geometric compression ratio may be varied over a range from 14 to 18. A high compression ratio is advantageous for the cold-start phase. Reducing the compression ratio as load increases will result in a greater attainable maximum load and will decrease particulate emission due to a greater ignition lag.

In this context it may be provided that the effective compression ratio be varied by shifting the closing time of at least one intake valve. By delaying the closing of the intake valve or by a very early closing of the intake valve—roughly 0° to 20° crank angle—the effective compression ratio may be reduced, thereby permitting a reduction of the exhaust gas recirculation rate required for low $NO_x$ and particulate emission. It is possible to shift both the opening time and the closing time of the intake valve, or to shift only the closing time. By shifting the end of intake to "late" in at least one operating region combustion noise may be significantly reduced. Smoke formation may be reduced and fuel consumption especially at higher loads may also be reduced. By shifting the end of intake forwards or backwards compression end temperature can be lowered and ignition lag can be increased. If the intake end is shifted to "early" there is an additional effect of charge cooling. Via the closing time of the intake valve the course of combustion, in particular the position of the main part of combustion (MFB 50%—mass fraction burned) can be controlled. This may be done additionally or in combination with MFB-50%-control via injection timing or as stand-alone control action in the case of nearly homogeneous HCCI-combustion (Homogeneous Charge Compression Ignition), where no correlation exists between start of injection and start of combustion or MFB-50%-time. Dampening of combustion, the curve of the heat release rate or position and value of the maximum gradient of cylinder pressure $dp/d\alpha$ (p . . . cylinder pressure, $\alpha$ . . . crank angle) may also be controlled via the closing time of the intake valves, either additionally to or combined with $dp/d\alpha$-control by internal exhaust gas recirculation, or as a stand-alone control action in the case of nearly homogeneous HCCI-combustion, where no correlation exists between injection start and start of combustion or MFB-50%-time. Furthermore the ignition lag (i.e. the time-window between injection start and start of main combustion without prior reactions) may be optimally controlled via the closing time of the intake valves, in particular combined with internal or external exhaust gas recirculation.

In HCLI- as well as in HPLI-operation it is of advantage if an intake swirl flow with swirl value $\geq 1$ is generated in the cylinder and if the fuel is transported by the squish flow downwards along the wall of the piston recess, where it evaporates at least partly, and subsequently along the bottom towards the center of the recess. The swirl is kept in being within the piston recess during the compression phase.

In another variant it is provided that a swirl-free intake flow with a swirl value <1 is generated in the cylinder and that the fuel is transported by the squish flow from the center of the recess along the bottom to the wall of the piston recess and farther on towards the constriction, evaporating at least partly along the way.

Somewhat surprisingly it has been found that the depressed piston recess does not significantly impair the start-up capability of an internal combustion engine operating under the HCLI and/or the HPLI-regime. The decrease of thermodynamic efficiency due to the squish flow will be more than compensated by improved mixture preparation in the piston recess as a consequence of high turbulence.

For implementation of the method an internal combustion engine with at least one injection device for direct fuel injection is suitable, which is also provided with a device for exhaust gas recirculation and with at least one cylinder with a reciprocating piston, which piston is provided with a clearly defined squish surface and a toroidal piston recess. In the transition area between squish surface and piston recess the piston has a circular constriction. This will on the one hand result in a significant squish flow and on the other hand will ensure that the flow enters the piston recess with relatively high velocity. The relatively high level of turbulence inside the piston recess is beneficial for thorough combustion and will result in significantly reduced HC and CO emission. It is of particular advantage if the piston recess is dimensioned such that the ratio of maximum recess diameter DB to piston diameter D lies in the range $0.5<D_B/D<0.7$ and the ratio of maximum recess depth $H_B$ to piston diameter D lies in the range $0.12<H_B/D<0.22$. This will permit the free length of the fuel jet to be as long as possible. For the formation of a marked squish it is preferably provided that the piston recess be dimensioned such that the ratio of the diameter of the constriction DT to maximum recess diameter $D_B$ lies in the range $0.7<D_T/D_B<0.95$.

Between squish surface and constriction an inflow region is provided in the shape of an annular depression with plane bottom and cylindrical wall. Preferentially it is provided that the depth of the depression is between 5% and 15% of the maximum recess depth, that the depression has an at least partly cylindrical wall and that the diameter of the depression in the region of the wall is 10% to 20% larger than the diameter of the constriction. The depression will cause a decrease of the radial velocity of flow out of the recess during the downward stroke of the piston. Part of the fuel is thereby guided in axial direction towards the cylinder head instead of along the piston top.

In order to increase cylinder charge especially in the case of high exhaust gas recirculation rates and to extend the range of loads in the HCLI-region, it may be provided that the internal combustion engine be operated in at least one operating region with pulsed supercharging. An internal combustion engine and a method for pulsed supercharging are for instance known from DE 199 08 435 A1.

In order to avoid $NO_x$ peaks at the end of short deceleration phases it is advantageous if during deceleration or overrun a throttle flap positioned in the inlet passage is closed and an exhaust gas recirculation valve in the exhaust gas recirculation duct is opened. From DE 101 18 878 A1 it is known to recirculate exhaust gas during deceleration of the internal combustion engine in order to avoid a temperature drop in the catalytic converter during prolonged phases of deceleration.

To avoid high particulate emission as a consequence of a fuel-air ratio that is too low it may be provided that the maximum permitted injection volume is computed from the minimum permitted fuel-air ratio and the actually measured mass of fresh air. Alternatively to measuring the mass of fresh air the present fuel-air ratio may be measured by a probe.

The actual present value of at least one combustion parameter used for combustion control may be computed as a weighted mean of the values in previous individual cycles. The actual present value of the position $MFB50_{ist}$ of the main part of combustion for a cycle z may be computed by the following formula, using weights of 40%, 30%, 20%, 10% for the last four individual cycles:

$$MFB50_{ist}(z) = 0.4 \cdot MFB50(z^{-1}) + 0.3 \cdot MFB50(z^{-2}) + 0.2 \cdot MFB50(z^{-3}) + 0.1 \cdot MFB50(z^{-4})$$

Furthermore it is of advantage to adapt the parameters of a combustion controller (e.g. a MFB50 controller) as a function of the target value. The parameters of the controller are adapted depending on the target value. If the position of the main part of combustion MFB 50% shifts in the late direction (e.g. in HPLI-operation) the influence of injection timing on the position of MFB50 increases (system gain increases). Therefore the control parameters (amplification factor) are adapted as a function of the target value MFB 50% in such a way that the transfer function of the closed control loop does not change for late combustion.

BRIEF DESCRIPTION OF THE DRAWINGS

The invention will now be explained in detail with reference to the attached drawings.

DETAILED DESCRIPTION OF THE PREFERRED EMBODIMENT

Figure 1:
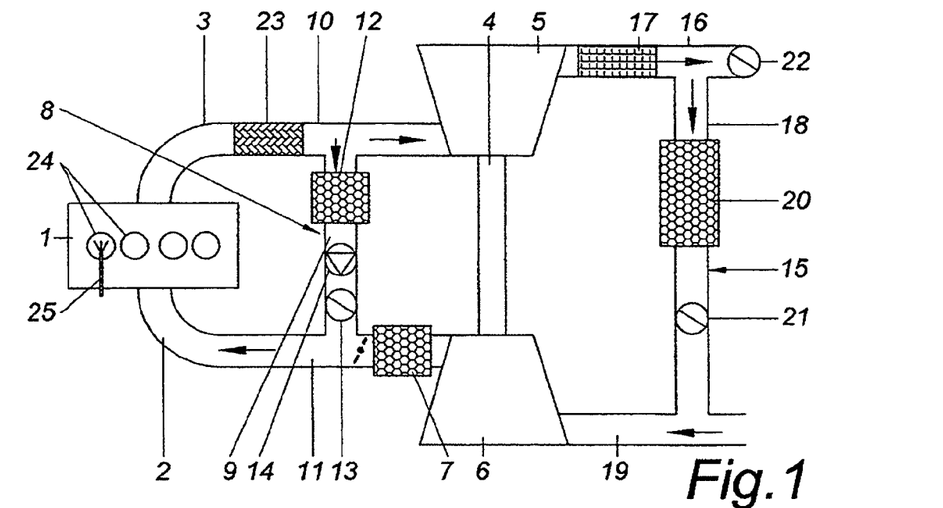
FIG. 1 shows a schematic view of an internal combustion engine suitable for the method of the invention.

FIG. 1 shows an internal combustion engine 1 with an intake manifold 2 and an exhaust manifold 3. The internal combustion engine 1 is charged by an exhaust gas turbocharger 4 comprising an exhaust-gas-driven turbine 5 and a compressor 6 driven by the turbine 5. On the intake side an intercooler 7 is placed following the compressor 6 in flow-direction.

Furthermore a high-pressure exhaust gas recirculation system 8 with a first exhaust gas recirculation line 9 is provided between the exhaust gas line 10 and the intake line 11. The exhaust gas recirculation system 8 comprises an exhaust gas recirculation cooler 12 and an exhaust gas recirculation valve 13. Depending on the pressure difference between the exhaust line 10 and the intake line 11 an exhaust gas pump 14 may be provided in the exhaust gas recirculation line 9 in order to control or increase the exhaust gas recirculation rate.

In addition to this high-pressure exhaust gas recirculation system 8 a low-pressure exhaust gas recirculation system 15 is provided downstream of the turbine 5 and upstream of the compressor 6, a second exhaust gas recirculation line 18 departing from the exhaust line 16 downstream from a particle filter 17 and opening into the intake line 19 upstream of the compressor 6. In the second EGR-line 18 a further EGR-cooler 20 and a further exhaust gas recirculation valve 21 are provided. For controlling the exhaust gas recirculation rate an exhaust gas valve 22 is placed in the exhaust line 16 downstream of the point of departure of the second exhaust gas recirculation line 18.

Upstream of the point of departure of the first exhaust gas recirculation line 9 an oxidating catalytic filter 23 is placed in the exhaust gas line 10, which removes HC, CO and volatile components of particulate emissions. As a side effect this will increase exhaust gas temperature and thus the energy supplied to the turbine 5. In principle the oxidating catalytic filter 23 could also be placed downstream of the point of departure of the first exhaust gas recirculation line 9. The variant shown in FIG. 1, with the exhaust gas recirculation line departing downstream of the catalytic filter 23, has the advantage that the exhaust gas cooler 12 is less subject to contamination, while it has the disadvantage that higher exhaust gas temperatures necessitate a higher cooling performance of the exhaust gas cooler 12.

As an alternative or in addition to supercharging by the compressor 6 pulsed supercharging could be applied. Pulsed supercharging has been further developed from pressure wave supercharging. An increase in cylinder charge is achieved if the length of the pressure wave tube corresponds with engine speed in such a way that the low pressure wave of the sucking cylinder after reflection at the pressure wave manifold reaches the intake valve as a high pressure wave, and if this high pressure is confined in the combustion chamber after the end of intake. The gas dynamics of charge exchange is enhanced by a pulse switching element in each suction pipe. If the pulse switching element is closed before the end of intake a pressure build-up in the inlet passage downstream of the pulse switching element can be achieved due to the compressive action of the returning piston. This kind of pressure storage requires a system of very well-sealing flaps with short switching times, in particular less than 10 ms—as measured in a switching motion from a first extreme position to a second extreme position and back.

For each cylinder 24 the internal combustion engine 1 has at least one injection valve 25 for direct injection of diesel fuel into the combustion chamber, which is capable of performing several injections per working cycle, the start of each injection being variable in a range of 50° crank angle CA before top dead center TDC to 50° crank angle CA after top dead center TDC. Injection pressure should be in the range from 500 bar to 2,500 bar, maximum injection pressure preferably being at least 1,000 bar.

The shape of the combustion chamber and the configuration of the fuel injection system should be designed like those for conventional full-load diesel combustion.

Figure 2:
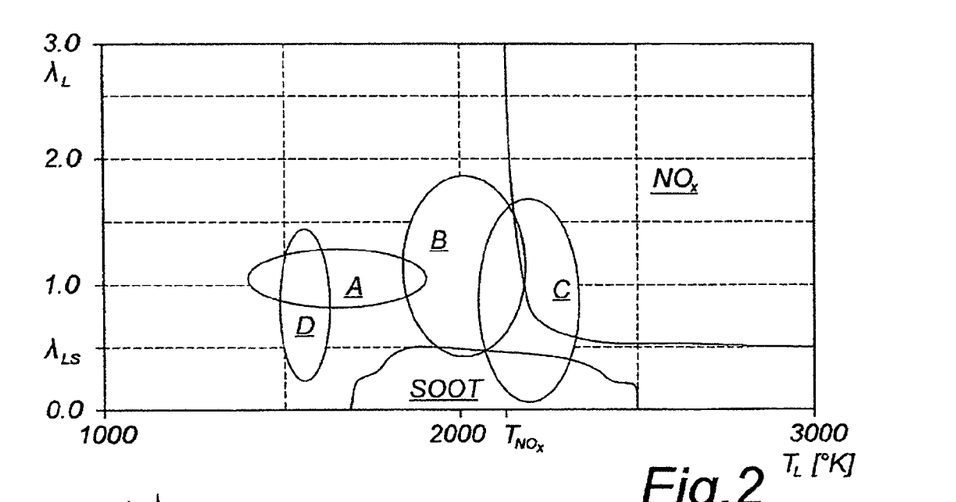
FIG. 2 is a diagram showing the local air-ratio $\lambda_L$ as a function of local temperature $T_L$.

FIG. 2 shows a diagram with the local air ratio $\lambda_L$ as ordinate and the local combustion temperature $T_L$ as abscissa. In the region designated SOOT a large amount of particulates is formed. $NO_x$ designates the region where nitrogen oxides are formed mainly. A, B and C, are the first, second and third operating regions according to the present invention.

Figure 3:
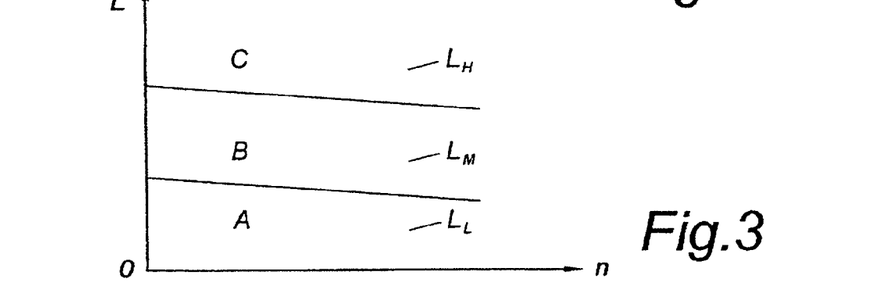
FIG. 3 is a load/speed diagram.

The first operating region A corresponds to a region of low to medium partial loads $L_L$, the second operating region B corresponds to a region of medium to high partial loads $L_M$, and the third operating region C corresponds to a region of high to full load $L_H$, as can be seen in the load/speed (L/n) diagram of FIG. 3.

In the first operating region A, also designated HCLI-region (Homogeneous Charge Late Injection), the start of injection occurs relatively early in the compression stroke, that is at 50° to 5° crank angle CA before top dead center TDC of the compression stroke, which provides a large ignition lag during which a partially homogeneous fuel-air mixture can be formed for premixed combustion. Due to thorough premixing and dilution extremely low particulate and $NO_x$ emissions can be attained. As can be seen from FIG. 2, the first operating region A lies significantly above the value $\lambda_{LS}$ of the local air ratio delimiting the region of soot formation. By using a high exhaust gas recirculation rate EGR of between 50% to 70% it is ensured that the local combustion temperature $T_L$ stays below the minimum temperature $T_{NOx}$ required for the formation of nitrogen oxides. Injection occurs at a pressure between 400 and 1,000 bar. The large ignition lag causes the combustion phase to be shifted into the area around top dead center TDC in which thermal efficiency is at an optimum. The main part of combustion takes place between −10° and 10° crank angle CA after top dead center TDC, thus resulting in high thermal efficiency. The high exhaust gas recirculation rate EGR, which is required for the first operating region A, may be achieved by external recirculation alone or by a combination of external and internal recirculation using variable valve control.

In the second operating region B the internal combustion engine is operated according to the HPLI-method (Highly Premixed Late Injection). The main part of the injection phase now lies after top dead center TDC. In the region B the engine is operated with an exhaust gas recirculation rate between 20% and 40%, the start of injection lying in the range of 2° crank angle CA before top dead center to 20° CA after top dead center. By completely separating the end of injection from the beginning of combustion a partial homogenization of the mixture and thus premixed combustion is achieved. Because of the lower temperature level as compared to conventional injection before top dead center, and because of the increased volume of recirculated exhaust gas, again as compared to conventional operation, the ignition lag is increased. Further measures may be adopted to increase ignition lag, such as decreasing the effective compression ratio $\epsilon$ and/or the intake temperature, or shortening the duration of injection by increasing injection pressure and/or the cross-section of the injection nozzle orifice. A short duration of injection is required if the end of injection is to precede the start of combustion. In this case particulate emissions may be kept at a very low level. This may be explained by the fact that the simultaneous presence of liquid fuel in the fuel jet and of the flame surrounding the jet in the conventional case is avoided, whereby oxidation reactions in the vicinity of the jet, which take place under lack of air and will generate particulates, are also eliminated. The late injection time together with the relatively long ignition lag leads to a backshift of the whole combustion process, thus causing a backshift of the cylinder pressure curve and a decrease of the maximum temperature, which will lead to a low level of $NO_x$-emission.

The retarding of the combustion process causes a reduction of maximum temperature, but at the same time leads to an increase in temperature at a certain later crank angle CA, which in turn results in an increased burning of particulates.

Shifting the combustion into the expansion stroke in combination with a high exhaust gas recirculation rate EGR will result in a rate of pressure increase in the cylinder which will remain within acceptable limits, despite a larger premixed fuel volume due to the large ignition lag and, consequently, a higher maximum combustion rate. The high maximum combustion rate, which closely approximates constant volume combustion, can at least partially compensate the loss of efficiency due to the backshifting of the combustion phase. To achieve high efficiency the main part of combustion should be as near as possible to top dead center TDC.

The advantage of the HPLI-method applied in the second operating region B lies in the very low level of $NO_x$ and particulate emissions and in the high exhaust gas temperature, which is advantageous for the regeneration of a particle filter. As can be seen from FIG. 2, the local combustion temperature $T_L$ in the second operating region B lies to a small degree above the lower $NO_x$ generating temperature $T_{NOx}$. For the most part the local air ratio $\lambda_L$ lies above the limit $\lambda_{LS}$ for the formation of soot or particulate matter. In the second operating region B particulates are formed at the beginning of the combustion process, but due to strong turbulence generated by the high-pressure injection and due to high temperatures the particles are oxidated towards the end of the combustion process and overall particulate emissions therefore are very low.

In the third operating region C the internal combustion engine is operated in a conventional manner with exhaust gas recirculation rates between 0 and 30%, multiple injections being possible. Thus both premixed and diffusive combustion may be used. For exhaust gas recirculation a combination of external and internal recirculation may be employed.

For reasons of comparison FIG. 2 also shows the operating region D. This region D is for instance used in U.S. Pat. No. 6,338,245 B1 in the medium to high load range. Its disadvantage is low efficiency due to the low temperatures. The present invention will avoid this operating region in general.

In the first, second and/or third operating region A, B, C a swirl may optionally be generated in the combustion chamber, which can further reduce particulate formation. Swirl and high efficiency must be balanced against each other.

It is of particular advantage if the valve timing of the internal combustion engine 1 can be variably adjusted. This will permit the rapid and precise adjustment of the EGR-rate between the operating regions A, B, C when the load changes. By combining external and internal exhaust gas recirculation a particularly fast and precise control of the exhaust gas recirculation rate EGR is possible. Finally variable valve control also permits adjustment of the effective compression ratio $\epsilon$, which in turn leads to lower nitrogen oxide and particulate emissions at a reduced exhaust gas recirculation rate EGR.

Figure 4:
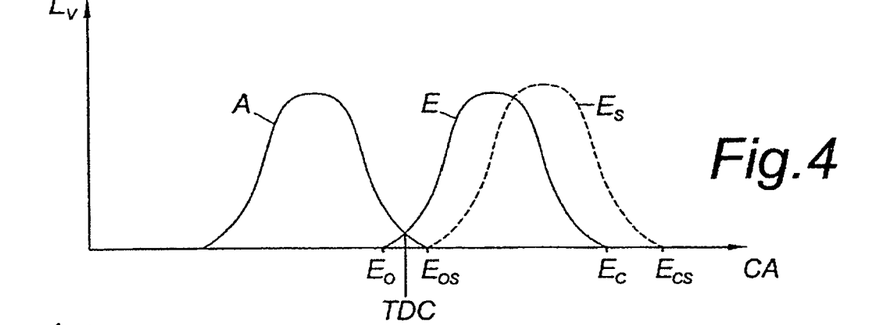
FIGS. 4 to 7 are valve lift diagrams for various timing regimes.

FIG. 4 shows a valve lift diagram, in which the valve lift $L_V$ of at least one exhaust valve A and at least one intake valve E are plotted against the crank angle CA. By shifting the intake valve curve E towards late, for instance by using a phase shifter, the effective compression ratio $\epsilon$ and the required exhaust gas recirculation rate EGR may be reduced. By varying the closing time of the intake valve the ignition lag may be adjusted. By retarding the closing time of the intake valve combustion noise may be significantly reduced. Furthermore a reduction of smoke and of fuel consumption at higher loads can be achieved. This may take place in all of the operating regions A, B, C. $E_O$ and $E_C$, respectively, designate opening and closing time of the intake valve E. $E_{OS}$ and $E_{CS}$ designate the beginning of opening and the closing time of the shifted intake valve lift curve $E_S$.

Figure 5:
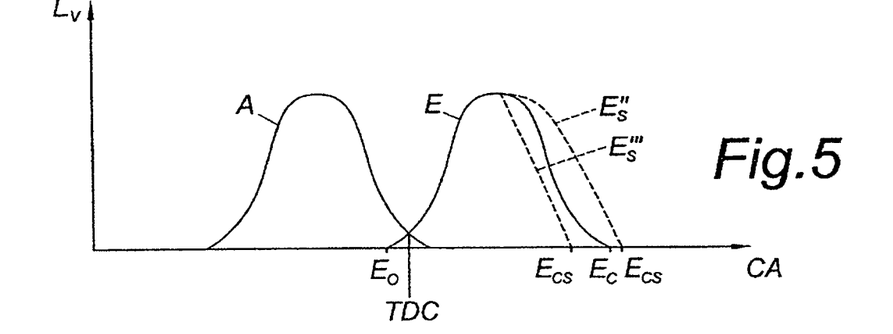

As an alternative only the closing slope of the intake valve lift curve E may be changed, which will move the closing time forwards or backwards, as is indicated by the lines $E_S''$ and $E_S'''$ in FIG. 5. This will essentially have the same effect as shifting the whole valve lift curve (FIG. 4).

Figure 6:
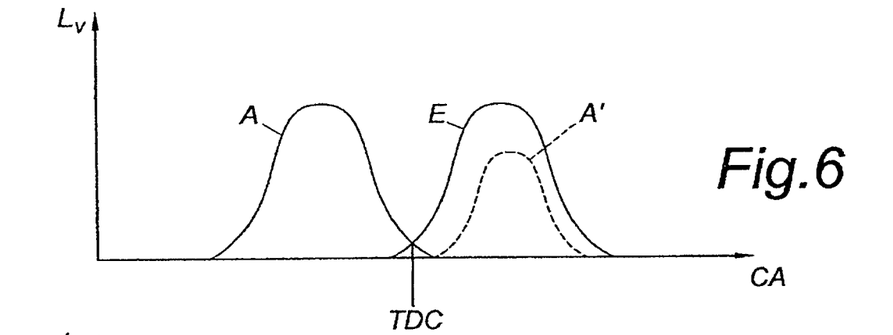
Figure 7:
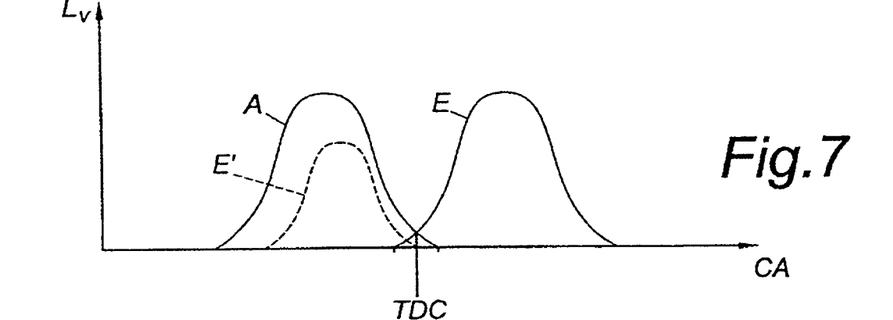

Internal exhaust gas recirculation may be effected by renewed opening of the exhaust valve during the intake stroke as shown by line A' in FIG. 6, or by renewed opening of the intake valve during the exhaust stroke as shown by line E' in FIG. 7. This will permit rapid control of the exhaust gas recirculation rate EGR in all of the operating regions A, B, C. It is possible to achieve changeover from the second operating region B with 20% to 40% EGR-rate to the first operating region A with 50% to 70% EGR-rate by using only internal exhaust gas recirculation and a forward shift of the beginning $\alpha_I$ of fuel injection I. The reverse changeover from the first operating region A to the second operating region B is also possible in this way.

Figure 8:
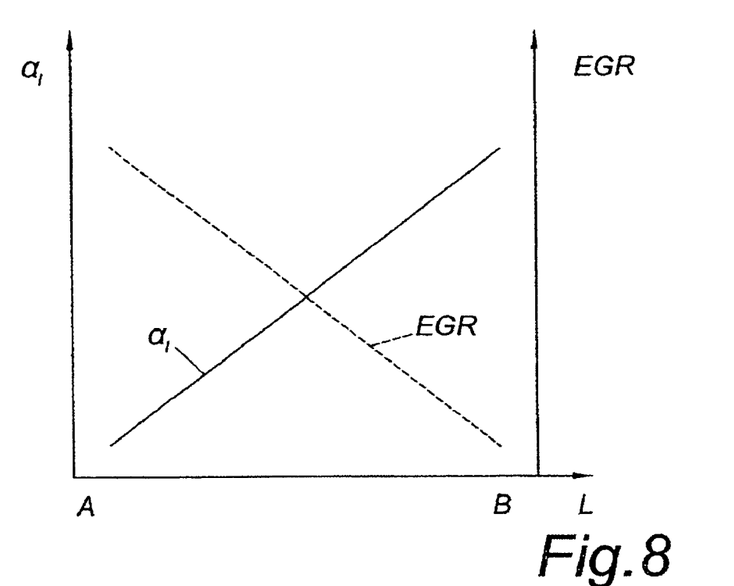
FIG. 8 is a diagram of injection time versus EGR-rate and load.

If variable valve control is not used, the changeover between first and second operating region A and B may be effected by reducing the external exhaust gas recirculation rate EGR and by simultaneously shifting the beginning $\alpha_I$ of fuel injection I forwards, as shown in FIG. 8. By simultaneously reducing the exhaust gas recirculation rate EGR and shifting the beginning of fuel injection I forwards backfiring can be avoided. Vice versa the changeover from the second operating region B to the first operating region A may be effected by simultaneously increasing the internal exhaust gas recirculation rate EGR and shifting forwards the beginning a, of fuel injection I.

Figure 9:
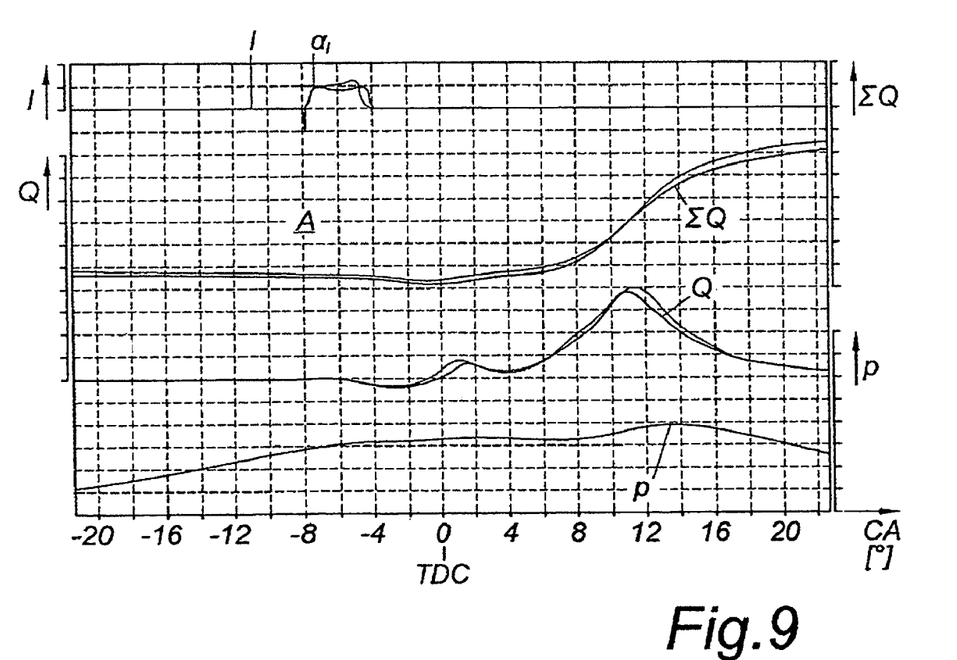
FIG. 9 is a measurement diagram for the first operating region A.
Figure 10:
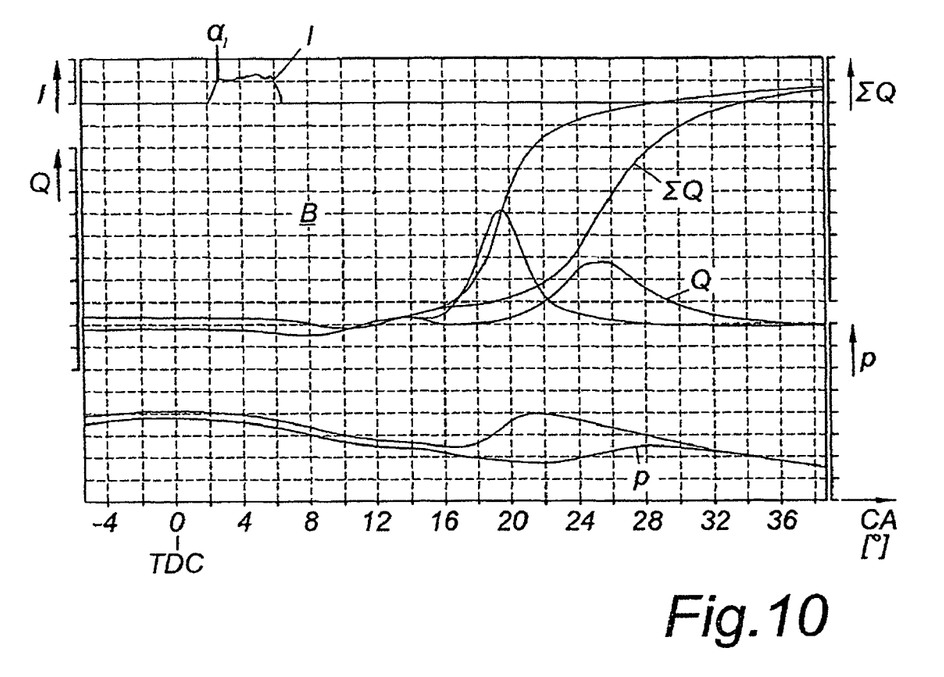
FIG. 10 is a measurement diagram for the second operating region B.

FIG. 9 shows a measurement diagram for an example of the first operating region A, where injection I, heat release rate Q, cumulative heat release rate ΣQ and cylinder pressure p are plotted against crank angle CA. FIG. 10 shows an analogous measurement diagram for the second operating region B. Thin and heavy lines represent different parameter configurations. The relatively large ignition lag between injection I and combustion can be clearly seen.

Figures 11, 12:
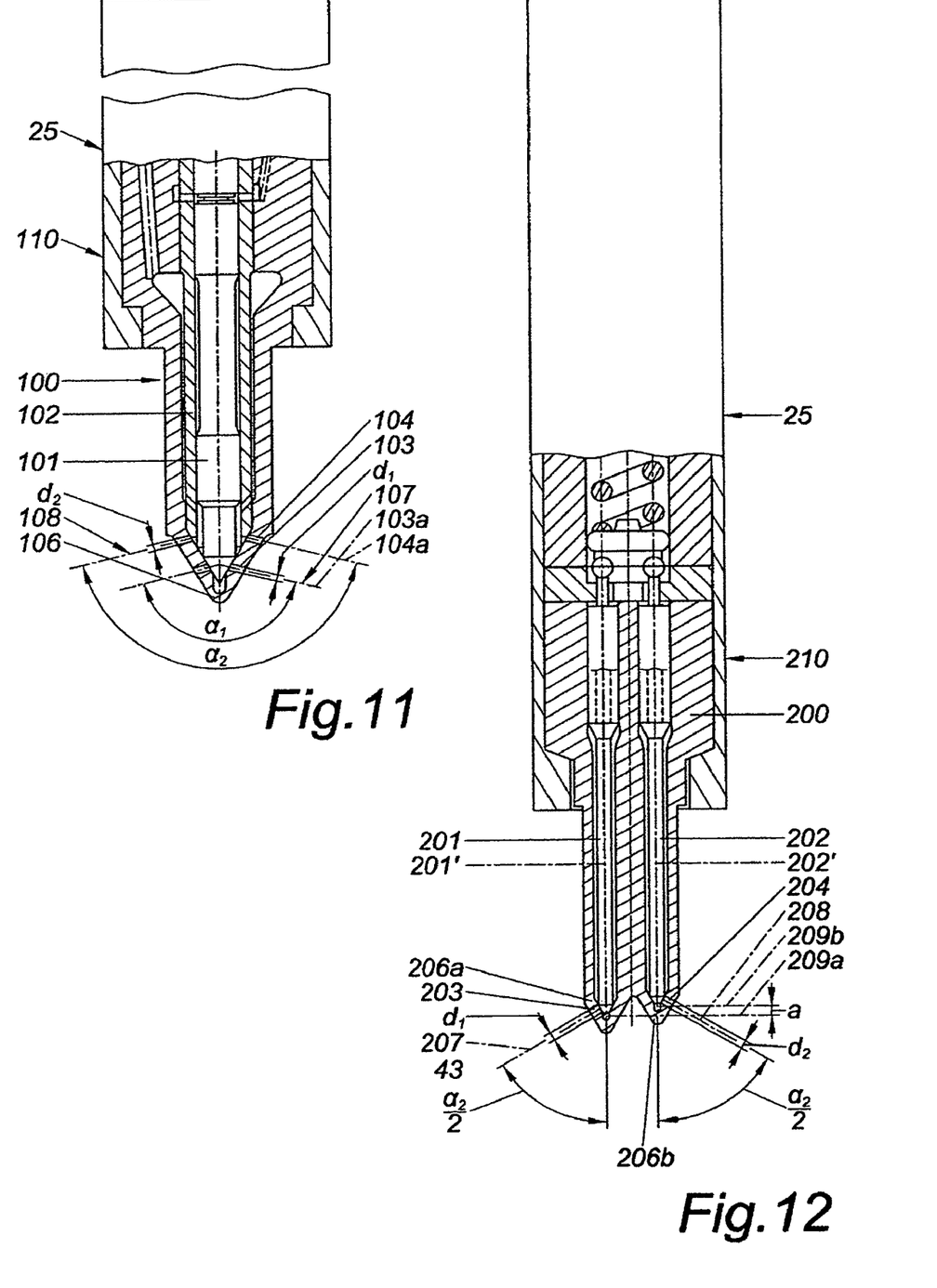
FIG. 11 shows a double needle nozzle with coaxial needle.
FIG. 12 shows a double needle nozzle with parallel needles placed side by side.
Figure 13:
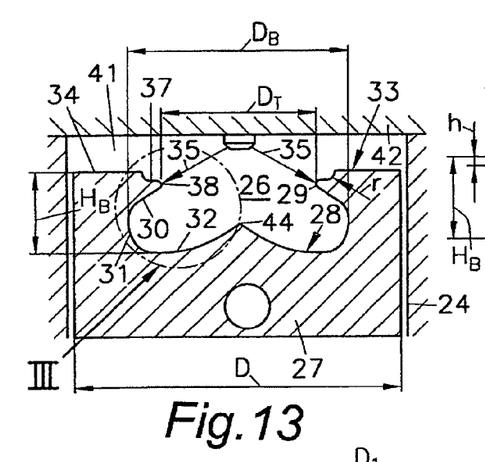
FIGS. 13 and 14 show a longitudinal section through the cylinder of an internal combustion engine according to the invention.

FIGS. 11 and 12 show injection valves 25 with nozzle holders 110, 210 holding double needle nozzles 100, 200.

The double needle nozzle 100 of FIG. 11 has a first nozzle needle 101, which can slide in a hollow second nozzle needle 102. The first nozzle needle 101 controls first injection orifices 103, the second nozzle needle 102 controls second injection orifices 104, both kinds of orifices being positioned in the nozzle nose 106. The sum of the diameters d, of the first injection orifices 103 is smaller than the sum of the diameters $d_2$ of the second injection orifices 104. The axes 103a, 104a of the first injection orifices 103 and the second injection orifices 104 are aligned along conical surfaces 107, 108, whose apex angles are designated $\alpha_1$ and $\alpha_2$. The apex angle $\alpha_1$ of the first injection orifices 103 is somewhat smaller than the apex angle of the second injection orifices 104.

The injection valve 25 shown in FIG. 12 has a double needle nozzle 200 with a first nozzle needle 201 and a second nozzle needle 202, both nozzle needles 201, 202 being positioned in parallel side by side. The nozzle axes 201' and 202' are at a distance from each other. The first nozzle needle 201 controls first injection orifices 203 and the second nozzle needle 202 controls second injection orifices 204, which are respectively located in nozzle noses 206a and 206b. The first and second injection orifices 203, 204 are aligned along conical surfaces 207, 208, whose apex angles are designated $\alpha_1$ and $\alpha_2$. The diameters of the first and second injection orifices 203, 204 are designated $d_1$ and $d_2$. The sum of the cross-sections of the first injection orifices 203 is smaller than the sum of the cross-sections of the second injection orifices 204. The injection orifices 203 of nozzle nose 206a open into the combustion chamber in a plane 209a normal to needle axes 201', 202' and the injection orifices 204 of nozzle nose 206b open into the combustion chamber in a normal plane 209b, with the planes 209a and 209b being at a distance a from each other. This distance keeps the jets from the injection orifices 203, 204 from interfering with each other at full load, that is from hitting each other. Preferentially both nozzle noses 206a and 206b have the same number of orifices, preferably three.

The first and second nozzle needles 101, 102, 201, 202 may be separately controlled in a known way, as is for instance described in DE 100 40 738 A1. In the first operating region A of the engine the nozzle needle 101, 201 is actuated and thus the first injection orifices 103, 203 are opened, while the second injection orifices 104, 204 remain closed. In the second operating region B the second nozzle needle 102, 202 is actuated, opening the injection orifices 104, 204, while the first injection orifices 103, 203 remain closed. By using separate injection orifices 103, 104, 203, 204 for each of the operating regions A and B, the injection characteristics for HCLI-operation in operating region A and HPLI-operation in operating region B can be optimally realised. In the third operating region C both nozzle needles 101, 102; 201, 202 are actuated, which results in injection through all orifices 103, 104; 203, 204.

As shown in FIGS. 13 to 16 the piston 27 reciprocating in the cylinder 24, has an essentially rotationally symmetrical toroidal piston recess 28 with a constriction 29, which produces an overhanging wall area 30. The side wall of the piston recess 28 is designated by 31, the bottom of the recess by 32 and the convex center of the recess by 44.

On the piston top 33 a squish surface 34 is provided outside of the constriction 29. The geometrical shape of the piston 27, the timing of injection and the injection geometry of the injection valve 25 are designed in such a way that the axes 35 of the injection jets are directed towards an area 36 (FIG. 15) around the constriction 29 between the side wall 31 and the squish surface 34. The area 36 comprises the overhanging wall area 30, the constriction 29 itself, and an inflow area 37 consisting of an annular depression 37a between squish surface 34 and constriction 29. The depression 37a has a plane bottom 37b and a cylindrical wall 37c with a transition radius r of between 1 mm and 50% of the depth $H_B$ of the piston recess. The depth h of the depression 37a is approximately 5% to 15% of the maximum recess depth $H_B$. The diameter $D_1$ of the depression 37a is 10% to 20% larger than the diameter $D_T$ of the constriction 29.

The piston recess 28 has a relatively large maximum diameter $D_B$, with the ratio $D_B$ to D lying in the range between 0.5 to 0.7. The ratio of maximum recess depth $H_B$ to piston diameter D is between 0.12 and 0.22, advantageously. This will permit the free length of the fuel jet to be long, which is of advantage for mixture formation. In order to produce a strong squish flow 43, the ratio of the diameter $D_T$ of the constriction 29 to the maximum piston recess $D_B$ should be between 0.7 and 0.95. This will result in high entry velocities into the piston recess 28, which is advantageous for homogenisation of the fuel-air mixture.

The geometry of the injection jets 35 and the geometry of the piston recess 28 may be optimised for a conventional diesel internal combustion engine at full load.

Figure 14:
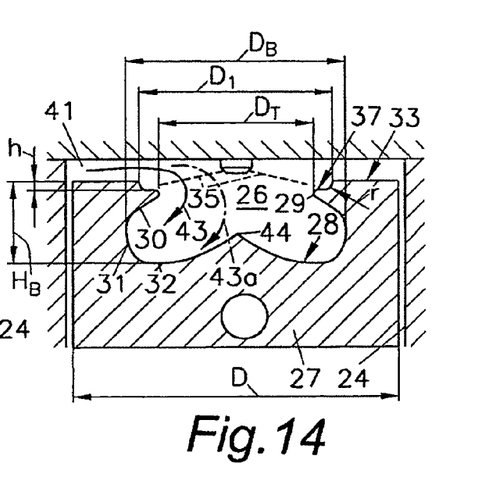

At least for HCLI-operation the following is valid: the first intersection points 38 of the axes 35 of the first injection jets of the greater part of injected fuel are located within the area 36 and vary depending on the load. At low load the intersection point 38 is located in the overhanging wall area 30. The lowest intersection point 38 at very low load is designated by the reference number 39. With increasing load the intersection point 38 is shifted in the direction of the squish surface 34, as indicated by arrow $P_1$ in FIG. 15. Reference number 40 in FIG. 15 indicates the topmost extreme position of the intersection point 38. At higher loads part of the injected fuel is injected into the squish space 41 between squish surface 34 and cylinder head 42 against the direction of the squish flow 43 resp. 43a. In FIG. 14 reference number 43 indicates the squish flow in the case of an intake flow with swirl, 43a indicates the squish flow in the case of swirl-free intake flow. Due to the upward motion of the piston 27 the intersection point 38 travels during injection in the direction of the piston recess 28 as indicated by arrow $P_1$. The squish flow 43, 43a generated by the squish surface 34 during the upward motion of the piston 27 causes part of the fuel entering the squish space 41 between piston top 33 and cylinder head 42, to be washed by the squish flow 43, 43a in the direction towards the piston recess 28 and to evaporate there. This results in very thorough mixing of the fuel with air, which on the one hand permits the maximum attainable load in HCLI-operation to be increased and on the other hand HC and CO emission to be further reduced. Combustion occurs inside the piston recess 28 as well as in the squish space 41.

The depression 37a causes a substantial reduction of the radial outflow velocity during the downward motion of the piston 27, and thus fewer fuel components to be transported to the piston top 33 and on towards the cylinder wall. Motor oil is thus less contaminated with combustion residues.

Figures 15, 16:
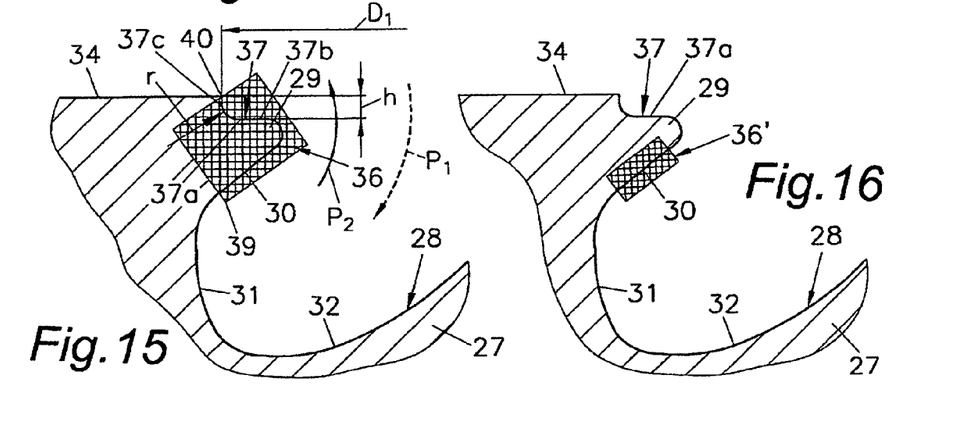
FIG. 15 shows detail III of FIG. 13.
FIG. 16 shows this detail according to the state of the art.

For comparison FIG. 16 shows the area 36' of the first intersection point of the injection jet at the beginning of injection in the top dead center region of a conventional diesel internal combustion engine with stratified operation. Area 36' usually remains in the overhanging wall area 30, regardless of the load situation. Thus the intersection point is not moved.

In HCLI-operation injection starts relatively early in the compression stroke, especially at low partial loads, that is between 50° to 5° crank angle before top dead center, resulting in a large ignition lag which permits formation of a partly homogeneous mixture for premixed combustion. Due to the thorough premixing and dilution extremely low particulate and $NO_x$ emission values can be achieved. The local air ratio always remains above the threshold relevant for soot formation. By a high exhaust gas recirculation rate of between 50% and 70% the local combustion temperature can be kept permanently below the minimum temperature at which nitrogen oxides are formed. Injection occurs at pressures of 500 to 2,500 bar. The long ignition lag causes the combustion phase to be shifted to a position near top dead center where efficiency is at an optimum. The main part of combustion lies in a range between approximately 10° crank angle before and 10° crank angle after top dead center, resulting in a high degree of efficiency. The high exhaust gas recirculation rate may be realised either by external exhaust gas recirculation alone or by a combination of external and internal exhaust gas recirculation via variable valve control. To obtain high turbulence for mixture formation, swirl-producing inlet passages generating high swirl values up to 5 will be advantageous.

If the internal combustion engine is operated according to the so-called HPLI-method (Highly Premixed Late Injection), the main part of the injection phase lies after top dead center. The internal combustion engine is operated with an exhaust gas recirculation rate between 20% and 40%, with the start of injection in a range between 2° crank angle before top dead center and 10° crank angle after top dead center. By completely separating the end of injection from the beginning of combustion a partial homogenisation of the fuel-air mixture and premixed combustion is achieved. Because of the lower temperature level, as compared with conventional injection before top dead center, and the larger volume of recirculated exhaust gas, as compared with conventional operation, the ignition lag is longer. To increase ignition lag, other measures may also be taken, such as a reduction of the effective compression ratio and/or of the intake temperature and shortening the duration of injection by increasing the injection pressure and/or increasing the cross-section of the injection nozzle orifices. Short duration of injection is required if the end of injection is to lie before the beginning of combustion. In this case particulate emissions may be kept at a very low level. This may be explained by the fact that the simultaneous occurrence of liquid fuel in the fuel jet and of the flame surrounding the jet in the conventional case will be avoided, whereby oxidation reactions in the vicinity of the jet taking place under air deficiency and thus generating particulates, will also be eliminated. The retardation of the beginning of injection together with the relatively long ignition lag leads to a shift of the whole combustion process towards "late", which will also shift the cylinder pressure curve and lower the maximum temperature, thus leading to low $NO_x$ emission values.

Retardation of the combustion process causes a decrease of maximum temperature, but also causes a temperature increase at a certain later crank angle, which in turn leads to enhanced burning of particulates.

The shifting of combustion into the expansion stroke together with the high exhaust gas recirculation rate results in a pressure increase rate in the cylinder remaining below the tolerated limit in spite of a larger volume of premixed fuel due to long ignition lag and a consequently higher maximum combustion rate. The high maximum combustion rate, which to a high degree approximates constant volume combustion, can compensate at least partly the efficiency loss due to back-shifting of the combustion process. To achieve a high degree of efficiency the main part of combustion should be close to top dead center.

The advantage of the HPLI-method lies in very low $NO_x$ and particulate emission and in the high exhaust gas temperature obtainable, which is of advantage in the regeneration of a particle filter. The local combustion temperature may for a small part lie above the lower threshold for $NO_x$ formation. The local air ratio lies mainly above the soot formation threshold. In HPLI-operation soot is generated at the start of the combustion process, but due to strong turbulence on account of high-pressure injection and due to high temperatures soot is oxidized towards the end of the combustion process, and thus particulate emission on the whole is very low. The high exhaust gas recirculation rate may again be achieved either by external exhaust gas recirculation alone or by a combination of external and internal exhaust gas recirculation via variable valve control. To obtain high turbulence in mixture formation swirl-generating inlet passages generating high swirl values up to 5 will be advantageous.

By the method described above an internal combustion engine may be operated in the first, second or third operating region A, B, C with high efficiency and low $NO_x$ and particulate emission.

In order to avoid $NO_x$ peaks at the end of short deceleration phases it is advantageous if during deceleration or overrun a throttle flap positioned in the intake passage is closed and an exhaust gas recirculation valve in the exhaust gas recirculation line is opened.

To avoid high particulate emissions as a consequence of a fuel/air ratio that is too low, it may be provided that the maximum permitted injection volume $Fuel_{Max}$ is computed from a minimum permitted fuel/air ratio $\lambda_{Min}$ and the actually measured mass of fresh air $Air_{act}$:

$$Fuel_{Max} = \frac{Air_{act}}{f_{stoich} \cdot \lambda_{Min}}$$

where $f_{stoich}$ is the stoichiometric weight ratio of air and fuel. Alternatively to measuring the mass of fresh air the actual fuel/air ratio may be measured by a probe.

The actual present value of at least one combustion parameter used for combustion control may be computed as a weighted mean of the values in previous individual cycles. The actual present value of the position $MFB50_{ist}$ of the main part of combustion for a cycle z may for instance be computed by the following formula, using weights of 40%, 30%, 20%, 10% for the last four individual cycles:

$$MFB50_{ist}(z) = 0.4 \cdot MFB50(z^{-1}) + 0.3 \cdot MFB50(z^{-2}) + 0.2 \cdot MFB50(z^{-3}) + 0.1 \cdot MFB50(z^{-4})$$

Furthermore it is of advantage to adapt the parameters of a combustion controller (e.g. a MFB50 controller) as a function of the target value. The parameters of the controller are adapted depending on the target value. If the position of the main part of combustion MFB 50% shifts in the late direction (e.g. in HPLI-operation) the influence of injection timing on the position of MFB50 increases (system gain increases). Therefore the control parameters (amplification factor) are adapted as a function of the target value MFB 50% in such a way that the transfer function of the closed control loop does not change for late combustion.

It is to be understood that the invention is not restricted to the embodiment(s) of the description, but that many changes and modifications will be possible within the framework of the invention, in particular such variants, elements, combinations and/or materials which are part of the invention, for instance by combination or modification of features or elements or process steps which are described in the general description of embodiments or in the claims or contained in the drawings, and will lead by combination of features to a new object or new process steps or sequences of process steps, including manufacturing, testing and working processes.

The invention claimed is:

1. Method for operating a directly injecting internal combustion diesel engine including the following steps:
   operating the internal combustion engine in a first operating region corresponding to low partial loads, with essentially homogeneous mixture combustion and late fuel injection, the latter starting in a range of about 50° to 5° crank angle before top dead center of a compression phase;
   operating the internal combustion engine in a second operating region corresponding to medium partial loads, with low-temperature mixture combustion and even later injection than in the first operating region, said fuel injection starting in a range of about 2° crank angle before top dead center to about 20° crank angle after top dead center of the compression phase;
   with fuel being injected into a combustion chamber in the first operating region via first injection orifices and in the second operating region at least via second injection orifices of an injection valve.

2. Method according to claim 1, wherein in the first operating region fuel is injected at a lower flow rate than in the second operating region.

3. Method according to claim 1, wherein in the first and second operating region fuel is injected in a shape of fuel jets forming a conical surface, an apex angle of a cone of the conical surface in the first operating region differing from that in the second operating region by being smaller in the former.

4. Method according to claim 3, wherein the apex angle of the cone in the first operating region is smaller than in the second operating region.

5. Method according to claim 1, wherein in the second operating region exhaust gas is re-circulated with an exhaust gas recirculation rate of 20% to 40%.

6. Method according to claim 1, wherein fuel injection in the second operating region uses an injection pressure of at least 1,000 bar.

7. Method according to claim 1, wherein fuel injection in the first operating region uses an injection pressure between 400 to 1,000 bar.

8. Method according to claim 1, wherein in the first operating region a main part of combustion lies in a range from—10° to 10° crank angle after top dead center.

9. Method according to claim 1, wherein in a third operating region corresponding to high partial load or full load, a beginning of the main part of fuel injection takes place in a range from—10° to 10° crank angle after top dead center.

10. Method according to claim 9, wherein at least in the third operating region internal exhaust gas recirculation is performed by opening the intake valve during exhaust phase and/or opening the exhaust valve during intake phase.

11. Method according to claim 9, wherein an effective mean pressure in the third operating region is at least 5.5 bar.

12. Method according to claim 9, wherein in the third operating region multiple injection is used.

13. Method according to claim 9, wherein in the third operating region the exhaust gas recirculation rate is 30% at most.

14. Method according to claim 9, wherein in the third operating region the exhaust gas recirculation rate is 10% to 20%.

15. Method according to claim 9, wherein in the third operating region fuel is injected through first and/or second injection orifices.

16. Method according to claim 1, wherein an overall air ratio lies between 1.0 and 2.0.

17. Method according to claim 1, wherein exhaust gas recirculation is performed externally and/or internally.

18. Method according to claim 1, wherein a swirl value is varied in at least one operating region depending on load and engine speed.

19. Method according to claim 1, wherein an effective compression ratio is varied by shifting a closing time of at least one intake valve.

20. Method according to claim 1, wherein at least in the first operating region internal exhaust gas recirculation is performed by opening the intake valve during the exhaust phase and/or opening the exhaust valve during the intake phase.

21. Method according to claim 1, wherein changeover from the first to the second operating region, respectively from the second to the first operating region, is initiated by reducing, respectively increasing, the exhaust gas recirculation rate.

22. Method according to claim 1, wherein changeover from the first to the second operating region or vice versa is initiated by reducing the internal or external exhaust gas recirculation rate and by retarding a beginning of injection, respectively by increasing the exhaust gas recirculation rate and advancing the beginning of injection.

23. Method according to claim 1, wherein a decrease of the required exhaust gas recirculation rate on changing from the first to the second operational region is achieved by shifting the opening and/or closing time of the intake valve towards late.

24. Method according to claim 1, wherein an effective mean pressure in the first operating region is between 0 to 6 bar.

25. Method according to claim 1, wherein an effective mean pressure in the second operating region is between 3.5 to 8 bar.

26. Method according to claim 1, wherein a maximum permitted injection volume is computed from a minimum permitted air/fuel ratio and an actually measured fresh-air mass or an actual air/fuel ratio.

27. Method according to claim 1, wherein at least one actual value of a combustion parameter required for controlling combustion is computed as a weighted mean of the values in preceding individual cycles.

28. Method according to claim 1, wherein at least one control parameter of a combustion controller is adapted as a function of a desired target value.

29. Method according to claim 1, wherein during at least one deceleration phase of the internal combustion engine the intake flow is cut off, and unthrottled exhaust gas recirculation is carried out.

30. Method for operating a directly injecting diesel internal combustion engine with at least one piston reciprocating in a cylinder including the step of operating the internal combustion engine in such a way that fuel combustion essentially occurs at a local temperature below a temperature threshold of $NO_x$ formation and with a local air ratio above a limit of particulate formation, fuel injection starting in a range of 2° crank angle before top dead center to about 10° crank angle after top dead center of the compression phase and exhaust gas being re-circulated at a rate of 20% to 40%, and where a piston with at least one squish surface and a toroidal piston recess and a constriction in the transition area between squish surface and piston recess is provided, and where on an upward stroke of the piston a squish flow directed from the outside into the piston recess is created and a turbulent base flow is initiated in the piston recess, and where the fuel is at least for a greater part injected into the toroidal piston recess and transported along a side wall of a piston recess and/or along the piston bottom, evaporating at least partially along the way.

31. Method according to claim 30, wherein in at least one operating region an intake flow with a swirl amounting to a swirl value $\geq 1$ is generated in the cylinder, and the fuel is transported by the squish flow along the side wall of the piston recess towards the piston bottom, evaporating at least partly along the way, and along the piston bottom to the center of the piston recess.

32. Method according to claim 30, wherein in at least one operating region a swirl-free intake flow, with a swirl value <1, is generated in the cylinder, and the fuel is transported by the squish flow from the center of the piston recess along the piston bottom to the side wall of the piston recess and onwards to the constriction of the piston recess, evaporating at least partly along the way.

33. Method according to claim 30, wherein fuel is injected in a direction of the constriction of the piston recess, an intersection point of a jet axis of at least one injection jet at the start of injection lying for a great part of a fuel volume in an area between a side wall of the piston recess and the squish surface, which area comprises an overhanging area of the side wall, the constriction and an inflow area between squish surface and constriction.

34. Method according to claim 30, wherein fuel injection is performed at an injection pressure of 500 to 2,500 bar.

35. Method according to claim 30, wherein the overall air ratio is set between 1.0 and 2.0.

36. Method according to claim 30, wherein the closing time of at least one intake valve of at least one cylinder in at least one operating region is shifted towards early or late.

37. Method according to claim 30, wherein a maximum permitted injection volume is computed from a minimum permitted air/fuel ratio and an actually measured fresh-air mass or an actual air/fuel ratio.

38. Method according to claim 30, wherein at least one actual value of a combustion parameter required for controlling combustion is computed as a weighted mean of the values in preceding individual cycles.

39. Method according to claim 30, wherein at least one control parameter of a combustion controller is adapted as a function of a desired target value.

40. Method according to claim 30, wherein during at least one deceleration phase of the internal combustion engine the intake flow is cut off, and unthrottled exhaust gas recirculation is carried out.

41. Method for operating a directly injecting diesel internal combustion engine with at least one piston reciprocating in a cylinder including the step of operating the internal combustion engine in such a way that fuel combustion essentially occurs at a local temperature below the temperature threshold of $NO_x$ formation and with a local air ratio above the limit of particulate formation, fuel injection starting in a range of 50° to 5° crank angle before top dead center of the compression phase and exhaust gas being re-circulated at a rate of 50% to 70%, and where a piston with at least one squish surface and a toroidal piston recess and a constriction in the transition area between squish surface and piston recess is provided, and where on the upward stroke of the piston a squish flow directed from the outside into the piston recess is created, and where the fuel is at least for the greater part injected into the toroidal piston recess and transported by the squish flow along the side wall of the piston recess and/or along the piston bottom, evaporating at least partially along the way.

42. Method according to claim 41, wherein in at least one operating region an intake flow with a swirl amounting to a swirl value $\geq 1$ is generated in the cylinder, and the fuel is transported by the squish flow along the side wall of the piston recess towards the piston bottom, evaporating at least partly along the way, and along the piston bottom to the center of the piston recess.

43. Method according to claim 41, wherein in at least one operating region a swirl-free intake flow, with a swirl value <1, is generated in the cylinder and the fuel is transported by the turbulent base flow from the center of the piston recess along the piston bottom to the side wall of the piston recess and onwards to the constriction of the piston recess, evaporating at least partly along the way.

44. Method according to claim 41, wherein fuel is injected in a direction of the constriction of the piston recess, an intersection point of a jet axis of at least one injection jet at the start of injection lying for a great part of a fuel volume in an area between a side wall of the piston recess and the squish surface, which area comprises an overhanging area of the side wall, the constriction and an inflow area between squish surface and constriction.

45. Method according to claim 44, wherein at low loads the intersection point is located in an overhanging wall area within the piston recess.

46. Method according to claim 44, wherein the intersection point is shifted in the direction of the constriction as the load increases.

47. Method according to claim 41, wherein the beginning of injection is advanced as the load increases from a range of 5° to 15° crank angle before top dead center, corresponding to a region of low partial load, to approximately 50° crank angle before top dead center.

48. Method according to claim 41, wherein fuel injection is performed at an injection pressure of 500 to 2,500 bar.

49. Method according to claim 41, wherein a main part of combustion is located in a crank angle range of 10° before top dead center and 10° after top dead center.

50. Method according to claim 41, wherein the overall air ratio is set between 1.0 and 2.0.

51. Method according to claim 41, wherein the closing time of at least one intake valve of at least one cylinder in at least one operating region is shifted towards early or late.

52. Method according to claim 41, wherein a maximum permitted injection volume is computed from a minimum permitted air/fuel ratio and an actually measured fresh-air mass or an actual air/fuel ratio.

53. Method according to claim 41, wherein at least one actual value of a combustion parameter required for controlling combustion is computed as a weighted mean of the values in preceding individual cycles.

54. Method according to claim 41, wherein at least one control parameter of a combustion controller is adapted as a function of a desired target value.

55. Method according to claim 30, wherein during at least one deceleration phase of the internal combustion engine the intake flow is cut off, and unthrottled exhaust gas recirculation is carried out.

56. A diesel internal combustion engine with direct injection, in which the beginning of fuel injection can be set in a range of 50° to 5° crank angle before top dead center of the compression phase, and which has an exhaust gas recirculation system with exhaust gas recirculation rates between 50% to 70%, and which is provided with at least one piston reciprocating in a cylinder, said piston having on its top face at least one squish surface and a toroidal piston recess with a constriction, side walls and bottom with essentially concave curvature and an overhanging wall area between side wall and constriction, wherein at least one jet axis of a fuel injection jet of an injection device for the greater part of an injected volume is directed at a beginning of injection towards an area between the side wall and the squish surface, which area comprises the overhanging wall area, the constriction and an inflow area between squish surface and constriction.

57. The internal combustion engine according to claim 56, wherein the internal combustion engine can be operated in at least one operating region with pulsed supercharging and wherein in at least one intake pipe a quick-acting pulse switching element is provided, said pulse switching element having switching times—from a first extreme position to a second extreme position and back to the first one—of 10 ms at most.

58. The internal combustion engine according to claim 57, wherein the pulse switching element is selected from the group flap, slide valve and rotary slide valve.

59. The internal combustion engine according to claim 56, wherein an intersection point of at least one jet axis of a fuel jet can be varied at a beginning of injection at least between the overhanging wall area and the constriction.

60. The internal combustion engine according to claim 56, wherein the piston recess is dimensioned such that a relation $0.5 < D_B/D < 0.7$ is valid for a ratio of maximum piston recess diameter $D_B$ to piston diameter D.

61. The internal combustion engine according to claim 56, wherein the piston recess is dimensioned such that a relation $0.12 < H_B/D < 0.22$ is valid for a ratio of maximum piston recess depth $H_B$ to piston diameter D.

62. The internal combustion engine according to claim 56, wherein the piston recess is dimensioned such that a relation $0.7 < D_T/D_B < 0.95$ is valid for a ratio of constriction diameter $D_T$ to maximum piston recess diameter $D_B$.

63. The internal combustion engine according to claim 56, wherein the inflow area is configured as an annular depression between squish surface and constriction.

64. The internal combustion engine according to claim 63, wherein the depression has a plane bottom leading into the piston recess.

65. The internal combustion engine according to claim 63, wherein the depression has a depth of between 5% to 15% of a maximum recess depth.

66. The internal combustion engine according to claim 63, wherein the depression has an at least partially cylindrical wall.

67. The internal combustion engine according to claim 66, wherein a diameter of the depression in the region of the wall is 10% to 20% greater than a diameter of the constriction.

68. A diesel internal combustion engine with direct injection, in which the start of fuel injection can be set in a range of 2° crank angle before top dead center and 10° crank angle after top dead center of the compression phase, and which has an exhaust gas recirculation system with exhaust gas recirculation rates between 20% to 40%, and which is provided with at least one piston reciprocating in a cylinder, with the piston having on its top face at least one squish surface and a toroidal piston recess, the recess having a constriction, side walls and bottom with essentially concave curvature and an overhanging wall area between side wall and constriction, and where at least one jet axis of a fuel injection jet of the injection device for the greater part of the injected volume is directed at the start of injection towards an area between the side wall and the squish surface, which area comprises the overhanging wall area, the constriction and an inflow area between squish surface and constriction.

69. The internal combustion engine according to claim 68, wherein the internal combustion engine can be operated in at least one operating region with pulsed supercharging and wherein in at least one intake pipe a quick-acting pulse switching element is provided, said pulse switching element having switching times—from a first extreme position to a second extreme position and back to the first one—of 10 ms at most.

70. The internal combustion engine according to claim 69, wherein the pulse switching element is selected from the group flap, slide valve and rotary slide valve.

71. The internal combustion engine according to claim 68, wherein the piston recess is dimensioned such that a relation $0.5 \geq D_B/D \geq 0.7$ is valid for a ratio of maximum piston recess diameter $D_B$ to piston diameter D.

72. The internal combustion engine according to claim 68, wherein the piston recess is dimensioned such that a relation $0.12 \geq H_B/D \geq 0.22$ is valid for a ratio of maximum piston recess depth $H_B$ to piston diameter D.

73. The internal combustion engine according to claim 68, wherein the piston recess is dimensioned such that a relation $0.7 \geq D_T/D_B \geq 0.95$ is valid for a ratio of constriction diameter $D_T$ to maximum piston recess diameter $D_B$.

74. The internal combustion engine according to claim 68, wherein the inflow area is configured as an annular depression between squish surface and constriction.

75. The internal combustion engine according to claim 74, wherein the depression has a plane bottom leading into the piston recess.

76. The internal combustion engine according to claim 74, wherein the depression has a depth of between 5% to 15% of a maximum recess depth.

77. The internal combustion engine according to claim 74, wherein the depression has an at least partially cylindrical wall.

78. The internal combustion engine according to claim 74, wherein a diameter of the depression in the region of the wall is 10% to 20% greater than a diameter of the constriction.

79. Method according to claim 1, wherein the internal combustion engine is operated in at least one operating region with pulsed supercharging.

80. Method according to claim 1, wherein the closing time of at least one intake valve of at least one cylinder in at least one operating region is shifted towards early or late.

* * * * *